(12) United States Patent
Kulkarni et al.

(10) Patent No.: US 12,028,254 B2
(45) Date of Patent: Jul. 2, 2024

(54) SYSTEMS FOR AND METHODS OF FLOW TABLE MANAGEMENT

(71) Applicant: Avago Technologies International Sales Pte. Limited, Singapore (SG)

(72) Inventors: Abhay Kulkarni, San Jose, CA (US); Rajan Sharma, San Jose, CA (US); Oron Levi, Tel Aviv (IL); Vamsi Tatapudi, Bangalore (IN); Mosi Ravia, Tel Aviv (IL)

(73) Assignee: Avago Technologies International Sales Pte. Limited, Singapore (SG)

( * ) Notice: Subject to any disclaimer, the term of this patent is extended or adjusted under 35 U.S.C. 154(b) by 72 days.

(21) Appl. No.: 17/589,357

(22) Filed: Jan. 31, 2022

(65) Prior Publication Data

US 2023/0246963 A1    Aug. 3, 2023

(51) Int. Cl.
*H04L 47/10* (2022.01)

(52) U.S. Cl.
CPC .................. *H04L 47/10* (2013.01)

(58) Field of Classification Search
CPC ......... H04L 47/10; H04L 45/38; H04L 45/74; H04L 45/7453; H04L 47/2441; H04L 47/2483; H04L 45/05
See application file for complete search history.

(56) References Cited

U.S. PATENT DOCUMENTS

| 2015/0146539 | A1* | 5/2015 | Mehta | H04L 47/125 370/237 |
| 2016/0254995 | A1* | 9/2016 | Wang | H04L 45/54 370/392 |
| 2017/0085482 | A1* | 3/2017 | Arad | G06F 16/245 |
| 2020/0059485 | A1 | 2/2020 | Ergin et al. | |
| 2020/0106867 | A1 | 4/2020 | Wang et al. | |
| 2021/0367887 | A1* | 11/2021 | Wang | H04L 61/10 |

FOREIGN PATENT DOCUMENTS

EP    1 435 582 B1    7/2004

OTHER PUBLICATIONS

European Extended Search Report on EP 22216734.8 dated Jun. 1, 2023.

* cited by examiner

*Primary Examiner* — Khaled M Kassim
*Assistant Examiner* — Najeeb Ansari
(74) *Attorney, Agent, or Firm* — Foley & Lardner LLP

(57) ABSTRACT

A switch includes memory including a flow table. The flow table includes a flow key database and a flow policy database for flows in a network associated with the switch. The switch includes a security processor including an exact match engine. The exact match engine manages the flow table in the memory. The exact match engine includes a learn cache configured to store key entries for storage in the flow key database.

20 Claims, 9 Drawing Sheets

SYSTEMS FOR AND METHODS OF FLOW TABLE MANAGEMENT

FIELD OF THE DISCLOSURE

This disclosure generally relates to systems for and methods of communicating data in a network environment. More specifically, the disclosure relates to systems for and methods of flow management in a network.

BACKGROUND OF THE DISCLOSURE

The communications industry is rapidly changing to adjust to emerging technologies and ever increasing customer demand. Demands for new network applications and higher performance is requiring communication networks to operate at faster speeds (e.g., higher band width). Many communication providers are using packet switching technology to achieve these goals. Storage, communications, entertainment, and computer systems utilize switches such as routers, packet switching systems, and other network data processing devices to communicate packets, frames or other data units.

Switches are components of networks which control the distribution of messages or data packets, frames or other data units based on address information contained within each data packet. The term "data packet" as used herein is not limited to a specific protocol or format of data unit or frame. The term "data packet" includes but is not limited to cells, frames, datagrams, bridge protocol data unit packets, packet data, and other data structures used in network communication. Computer and network security can be severely threatened by security attacks by software vulnerabilities and other issues. Information flow tracking in networks can be used to detect a wide range of security attacks. A security switch in a network performs flow tracking using a large flow table which works in association with various device components such as processors, external memory and central processing unit (CPU) subsystems. Flow tracking can be complex, can require computing/networking resources and can affect communication bandwidth.

BRIEF DESCRIPTION OF THE DRAWINGS

Various objects, aspects, features, and advantages of some embodiments in the specification will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

Figure 1:
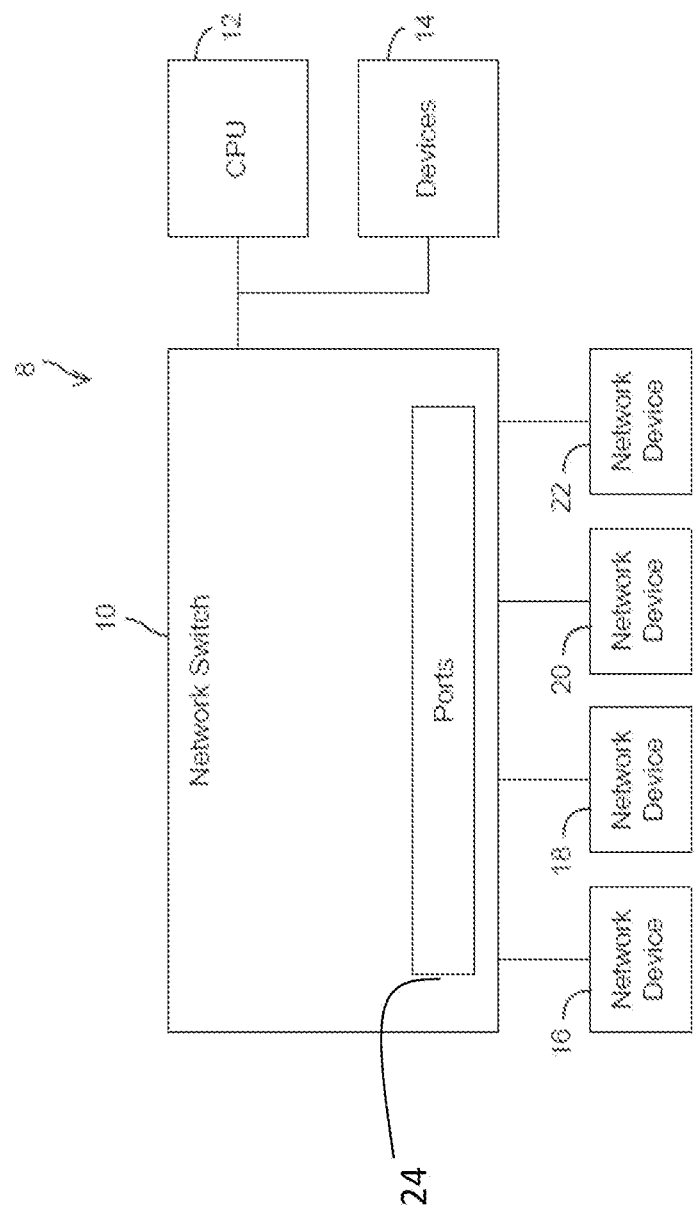
FIG. 1 is a general block diagram depicting a network device within a network according to some embodiments.

The details of various embodiments of methods and systems are set forth in the accompanying drawings and the description below.

DETAILED DESCRIPTION

A security switch or other network device can perform flow tracking in association with various device components (e.g., a packet processor, an external memory and a CPU subsystem). The flow tracking can be performed separate from the forwarding lookup operations (e.g., Ethernet Layer2/Layer3) and can be performed before permitting flows into the network in some embodiments. In some embodiments, systems and methods support a very high scale of flow (e.g., hundreds of millions of flows). In some embodiments, memory external to a processor of a security switch is provided in a package with the processor. The memory can be a dynamic random access memory (DRAM), such as, a Double Data Rate Synchronous Dynamic Random Access Memory (DDR SDRAM) or high bandwidth (HB) memory.

In some embodiments, a switch is configured to perform complex flow management. Systems for and methods of flow management can achieve high flow table scale, high flow learn/age rate, distributed system support, complex flow life cycle, and operation coherency at higher scales than conventional flow management techniques. In some embodiments, the systems and methods utilize a flow table (also referred to as a flow key table or hash table) having hundreds of millions of entries (e.g., one per flow where a flow is a unidirectional communication flow identified by source and destination identifiers). In some embodiments, each entry is a few hundred bits wide and includes a key and a short policy.

The flow table utilizes techniques and cohesive engines that enable flow management with high performance metrics (e.g., greater than 100 million flow entries, greater than 100 million packet key lookups per second, greater than 10 million learn and age events per second, greater than 100 thousand CPU update operations per second) in some embodiments. In some embodiments, the systems and methods are used in a distributed system with multiple flow processing nodes and multiple working central processing units that manage the security switch.

In some embodiments, a switch includes memory and a security processor. The security processor includes a memory controller, a cache coherency management unit, an exact match engine, and a packet processor. The security processor is configured to perform hardware based reordering of entries in a flow table stored in the memory.

In some embodiments, a switch includes memory including a flow table. The flow table includes a flow key database and a flow policy database for flows in a network associated with the switch. The switch includes a security processor including an exact match engine. The exact match engine manages the flow table in the memory. The exact match engine includes a learn cache configured to store key entries for storage in the flow key database.

In some embodiments, a switch includes memory and a security processor. The security processor includes an exact match engine. The exact match engine manages a flow table in the memory. The flow table is configured to have a flow key database separate from a flow policy database, and the exact match engine includes a learn cache configured to store key entries.

In some embodiments, the security processor is configured to provide a complex flow management which achieves high flow table scale, high flow learn/age rate, distributed system support, complex flow life cycle, and/or operation coherency. In some embodiments, the security processor is configured to provide learn rate enhancements, age rate enhancements, and/or table indirection (or dereferencing) to achieve scale while performing complex flow management. The phrase learn rate enhancements refer to faster identification of new flows and placement of entries for new flows into the flow table compared to conventional flow management techniques. The phrase age rate enhancements refers to faster identification flows that are no longer being used and removal of entries for those flows from the flow table compared to conventional flow management techniques. The phrase providing table indirection refers to providing a table configuration where a reference or data container in the flow table is used to obtain values for a flow.

In some embodiments, the security processor is disposed on a single integrated circuit (IC) substrate. In some embodiments, the memory is disposed on a separate IC device. In some embodiments, the security processor and the memory are in a single package (e.g., contained in one case, such as a single case containing multiple ICs and an interposer board and having pins, solder balls, contacts, or other leads or conductors for making electrical connections to other devices). In some embodiments, the security processor and the memory are disposed on an interposer board.

In some embodiments, the security processor is configured to pipeline a simple case (e.g., a case not requiring reordering) and to serialize a reorder case. In some embodiments, the security processor comprises a hardware-based reorder engine.

In some embodiments, a method of flow management includes receiving a packet at a switch, determining a working processor identification, performing a flow table learn using the working processor identification for an entry, and writing the entry to a learn cache integrated with the switch.

In some embodiments, the method further includes determining if the learn cache is full before writing the entry. In some embodiments, the method further includes performing a bucket read after writing the entry to the learn cache. A bucket is a storage vehicle in the flow table for a flow and can store parameters for entries in some embodiments. In some embodiments, the method further includes initiating a reorder operation if the buckets are full. In some embodiments, the method further includes determining if an empty bucket exists, and inserting the entry into the flow table if the empty bucket exists.

In some embodiments, an apparatus includes a memory configured to store a flow table and a processor separate from the memory and configured for packet processing. The processor includes a cache, an engine, and a packet processor. The engine is configured to manage the flow table. The learn cache is used to place an entry for a new flow in the flow table.

In some embodiments, the processor is configured for hardware reordering, learn rate enhancements, age rate enhancements, and table indirection to achieve scale while performing complex flow management. In some embodiments, the flow table comprises key entries and policy index entries. In some embodiments, the key entries and policy index entries are decoupled from each other. In some embodiments, two key entries point to or are linked to one policy entry for bidirectional flows.

Network Device

With reference to FIG. 1, an exemplary configuration of a network 8 includes a network device 10. The network device 10 may be a hardware-based and/or software-based device such as a network switch for moving data packets in network 8 according to address information contained within the packet itself. In some embodiments, the network device 10 additionally and/or alternatively performs router operations. The network device 10 can be any device configured to communicate data in or across networks. In addition, although the disclosure may refer at times to a "switch" and "switching," for the purposes of this description, the terms "switch" and "switching" may include both switching and routing. The term hardware refers to circuitry configured for a particular operation that does not load a program of instructions to a general purpose processor to perform the particular operation of the circuitry. The circuitry can be configured by data in registers, memory, or other storage and can work with software instructed processors to perform a network operation. Examples of hardware include dedicated circuits, ASICS, programmable logic devices, non-programmable logic devices, arithmetic logic units, counters, caches, memory or cache management units, match engines, combinations thereof, etc.

The network device 10 is a network switch functionally connected to a CPU 12 and other external devices 14 in some embodiments. External devices 14 may be other external processors, external memory, other network devices, such as, servers, routers, or computers, and/or other network switches, access points, and routers. External devices 14 can expand the switching capability in network 8. CPU 12 can be used to program the network device 10 based on desired rules or protocols for packet processing. Network device 10 may also include other components not shown. For example, network device 10 may include Ethernet port interface controllers, gigabit port interface controllers, internet port interface controllers, and additional buffers.

Data received from external device(s) 16, 18, 20, and 22 at ports 24 can be processed by network device 10 independent of CPU 12 based on programmed instructions or packet processing rules. The processed data is redistributed across the ports 24 to the appropriate external device(s) 16, 18, 20, and 22 based on the programmed instructions or packet processing rules. The network device 10 can be an integrated, modular, single chip solution. In some embodiments, network device 10 includes an application-specific integrated circuit (ASIC) constructed according to the packet processing rules, a field programmable gate array (FPGA), a communications processor, or any other type and form of dedicated silicon logic or processing circuitry capable of processing and switching packets or other data units. Additionally and/or alternatively, network device 10 can be a number of individual components on a circuit board or an interposer or can be implemented on a general purpose device, or general purpose devices configured via software.

Packet processing can include reading, modifying, and classifying the packet, changing the packet forwarding behavior, removing and/or appending information to the packet, mirroring the packet to another port, storing the packet in a buffer, reordering the packet in a series of packets, sending the packet to a service queue, recirculating or looping back a packet, or changing the type of packet. Any of devices 10, 16, 18, 20, and 22 can be configured as a switch configured to perform flow management.

Figure 2:
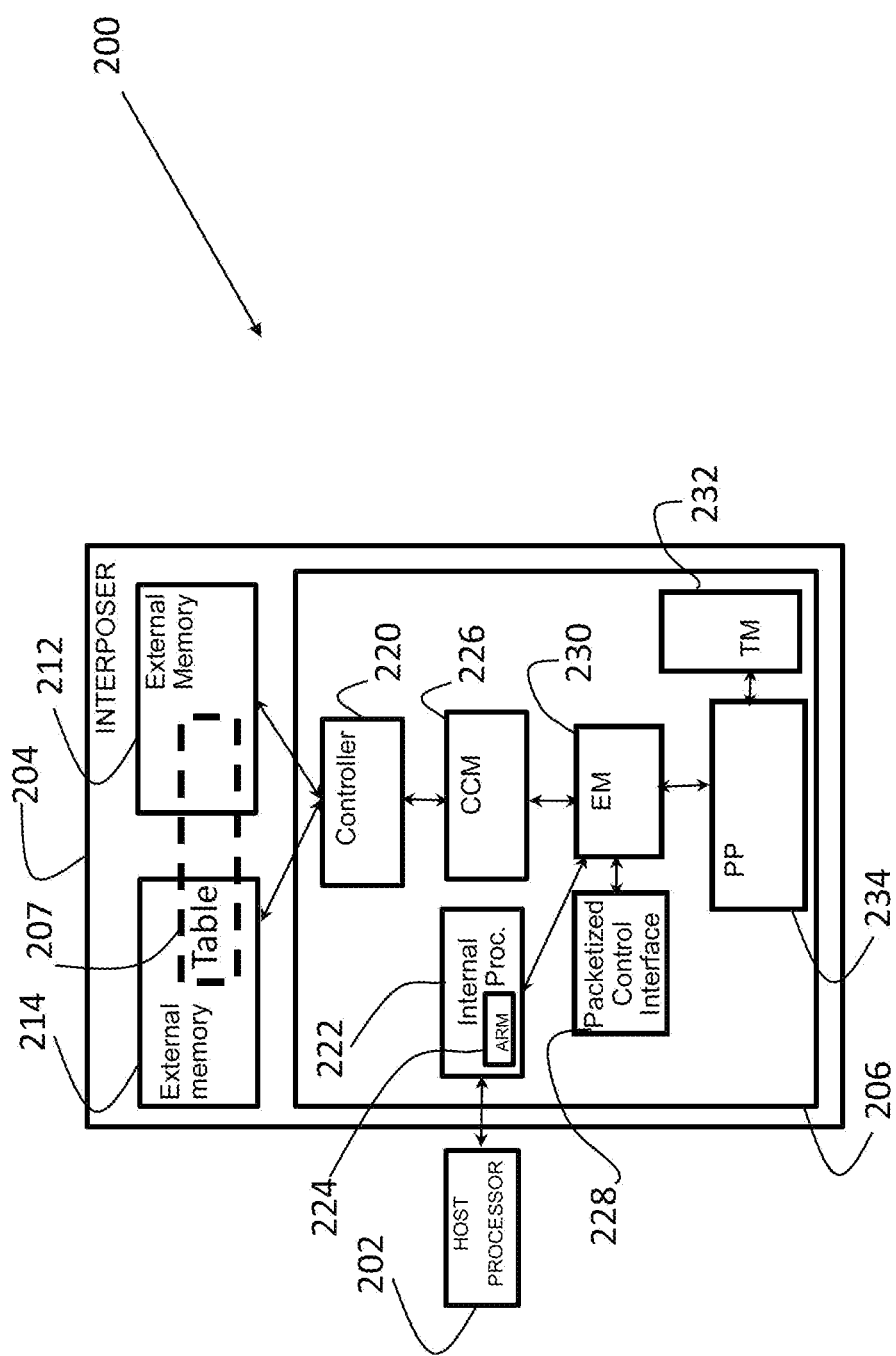
FIG. 2 is a block diagram of a security switch capable of being used in the network illustrated in FIG. 1 according to some embodiments.

With reference to FIG. 2, a system 200 includes a host processor 202 and a security switch 204. Security switch 204 can be used as any of network device 10 or external devices 16, 18, and 20 in network 8 (FIG. 1) or can be an additional device in communication with devices 10, 16, 18, 20, and 22. In some embodiments, security switch 204 is provided as a system in an integrated circuit (IC) package with a security processor 206, an external memory 212, and an external memory 214. The security processor 206, external memory 212, and external memory 214 are each separate integrated circuits (ICs) disposed on an interposer in the IC package in some embodiments. Security switch 204 can be embodied as a 2/3×HBM2E 4/8 stack device. In some embodiments, security switch 204 is a non-security network switch.

External memories 212 and 214 are any type of storage devices and are in communication with the security switch 204 via the interposer. In some embodiments, external memories 212 and 214 are high bandwidth (HB) memory devices. In some embodiments, external memories 212 and 214 are dynamic random access memory (DRAM) ICs. Although two memories are shown in FIG. 2 (external memory 212 and external memory 214), a single memory or three or more memories can be utilized.

External memories 212 and 214 each have a large storage capacity and are capable of storing a flow table 207 with hundreds of millions of entries. In some embodiments, each entry is a few hundred bits wide and includes a key and short policy. Each key includes a set of packet fields that uniquely identify a flow. Each short policy includes intrinsic rules/actions that apply to the flow.

Security processor 206 of security switch 204 is provided as a hardware unit that processes packets and performs flow management as described below according to some embodiments. In some embodiments, security processor 206 of the security switch 204 includes an external memory controller 220 in communication with external memories 212 and 214, cache and coherency management controller 226, packetized control interface 228, exact match engine 230, an internal processor 222, a packet processor (PP) 234, and a traffic management unit 232.

Internal processor 222 includes an advanced reduced instruction set computer (RISC) machine (ARM) 224. In some embodiments, cache and coherency management controller 226 is in communication with external memory controller 220 and exact match engine 230. Cache and coherency management controller 226 manages the external memory transactions with memories 212 and 214 using read and write caches (e.g., read cache 712 and write cache 714 in FIG. 7). Traffic management unit 232 uses network monitoring tools and management techniques, such as bandwidth monitoring, deep packet inspection and application based routing to ensure optimal network operation.

External memory controller 220 is in communication with cache and coherency management controller 226 and external memories 212 and 214. External memory controller 220 handles the physical interface from the security switch 204 to the external memories 212 and 214. The combination of controller 220, cache and coherency management controller 226 and external memories 212 and 214 is an HBM subsystem (e.g., HBM subsystem 840 (FIG. 8) in some embodiments). External memory controller 220 and cache and coherency management controller 226 are hardware units in some embodiments.

Exact match engine 230 manages the flow table 207 (e.g., flow key table or hash table) which is maintained in one or both external memories 212 and 214. Exact match engine 230 is a hardware unit that uses matching and a cache (e.g., learn cache 704 (FIG. 7)) to appropriately write entries to flow table 207. The learn cache 704 is a cache that is used to store entries for flows that have recently been learned (e.g., the learn cache is a cache that stores entries for flows that are about to be entered into the flow table 207). The flow table 207 includes flow logical databases in some embodiments. For example, the flow table 207 includes the following databases (DBs): Flow-{Key+Policy}-DB(hash,200M), Flow-Policy-DB(index,200M), Short Flow-State-DB(index, 200M), Flow-stats-DB(index,200M ingress+200M egress). The flow table 207 is used in flow learning and flow aging operations implemented in hardware as explained below.

Internal processor 222 is a local CPU and can be disposed on a different line-card (e.g., host CPU line card) in a chassis system or be integrated with security switch 204 (e.g., integrated with processor 206). In some embodiments, the line card is connected through the peripheral component interconnect e (PCIe) subsystem. In some embodiments, the local CPU is embedded inside internal processor 222 (e.g., as an advanced risc machine (ARM) processor 224). Internal processor 222 is coupled to exact match engine 230 and host processor 202.

Host processor 202 is a worker CPU (WCPU) in some embodiments. The WCPU is disposed on a different line card in a chassis system from the security switch 204 in some embodiments. Host processor 202 includes 64 CPUs each with 32 cores in some embodiments.

Packetized control interface 228 is coupled to the exact match engine 230. Packetized control interface 228 reads the flow table 207 and transfers the flow records reliably to either the WCPU (e.g., host processor 202) or a backup network switch (e.g., backup security switch 308) in some embodiments. Packetized control interface 228 is a hardware unit in some embodiments. Packetized control interface 228 is a highly reliable transport engine in some embodiments.

Security switch 204 supports scales of up to hundreds of millions of flows in some embodiments. Each flow is uniquely identified using a 5-tuple and Zone_ID, where Zone_ID is similar to class ID in some embodiments. As a part of flow tracking, security switch 204 tracks flow-state and flow-stats (ingress and egress). Multiple logical DBs, such as, flow-key, flow-policy, flow-state, and flow-stats DBs, are maintained in the HBM sub-system (e.g., associated with external memories 212 and 214). Collectively, this data can be referred to as FLOW-DBs.

Security switch 204 maintains the flow table 207. In some embodiments, a hardware unit (e.g., exact match engine 230) identifies new flows and inserts the flow-key, flow-policy, flow-state, and flow-stats for the new flows into flow-DBs using a flow learning process. In some embodiments, the hardware unit (e.g., exact match engine 230) identifies inactive flows using a flow-aging process. Security switch 204 removes the identified inactive flows from the flow table 207 in some embodiments.

Figure 3:
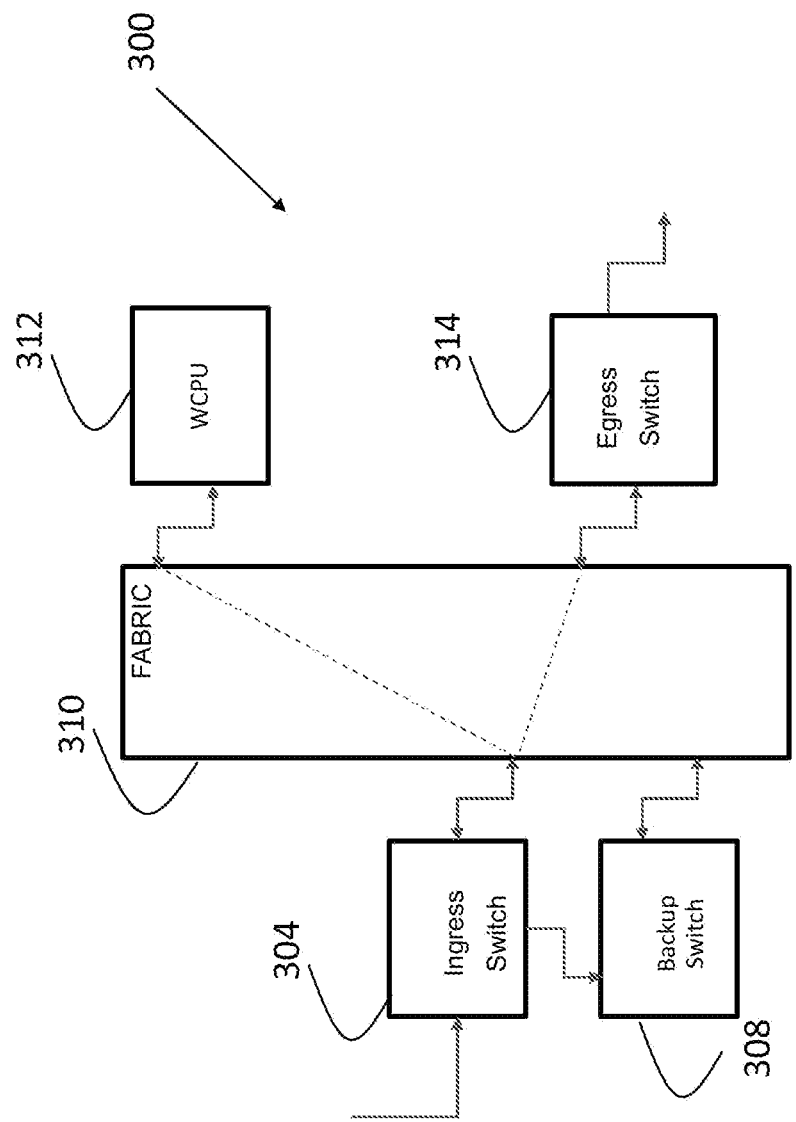
FIG. 3 is a block diagram of a system including a set of network security switches, each similar to the security switch illustrated in FIG. 2 according to some embodiments.

With reference to FIG. 3, a system 300 includes an ingress security switch 304, a backup security switch 308, a switch fabric 310, a WCPU 312, and an egress security switch 314.

Ingress security switch 304, backup security switch 308, and an egress security switch 314 can be similar to security switch 204 (FIG. 2) in some embodiments. WCPU 312 is similar to host processor 202. Switch fabric 310 is any network topology and can include network nodes interconnected via one or more network switches, such as crossbar switches and other switches, in some embodiments.

Ingress security switch 304 provides an ingress for packets of the flow into the system 300. Egress security switch 314 provides an egress for packets of the flow leaving the system 300. Backup security switch 308 provides redundancy and support for ingress security switch 304 and/or egress security switch 314. Packets communicated in system 300 contain one or more flow records and are communicated among ingress security switch 304, backup security switch 308, egress security switch 314, and WCPU 312. Each flow record includes a 5 tuple, a zone ID, a Local Flow ID (LFID), an Egress-LFID (E-LFID), and a new flow policy (e.g., {flow-key (5-tuple+ZONE_ID), I-LFID, E-LFID, new-flow-policy}). Switches 304, 314, and 308 update the flow table 207 for the flow accordingly. After this update, all the packets of the flow are forwarded according to the updated policy and the flow entry is marked final. The flow policy is a software installed policy that applies to packets of a flow and can include a short policy (also known as a short flow policy) in some embodiments.

In some embodiments, switches 304, 314, and 308 update the Flow ID (FID). Each of switches 304, 314, and 308 can communicate with the WCPU 312 for a flow using FID as the identifier. Local Flow ID (LFID) is a logical flow identifier that provides a unique index for the indirection between the flow key database (e.g., database 402 (FIG. 4)) and flow policy/state/statistics database (e.g., database 406, 408, and 410 (FIG. 4)) in the flow table 207 in some embodiments. LFID is a unique free-pointer assigned to the first packet of new flow by switch 304 in some embodiments.

In an ingress operation, the LFID (also called Ingress-LFID) can be used as the index to flow-policy/state/ingress-stats databases in flow table 207 (FIG. 2) of switch 304. Flow state includes identifiers that denote the state of a flow, and are updated by hardware on each packet in some embodiments. Flow statistics include counters associated with a flow and are maintained by hardware units of switch 304 in some embodiments.

Egress-LFID (E-LFID) is a unique free-pointer assigned to flow that egresses switch 314. This parameter is used as an index to flow-egress-stats (e.g., database 502 (FIG. 5)) in switch 314. Global Flow ID (GFID) can include ingress and egress identification (e.g., an ingress switch ID, Ingress-LFID, an egress switch ID, Egress-LFID) and is a system wide unique identifier for a flow. The association of the flow and GFID is maintained by the WCPU 312.

In some embodiments, switches 304, 314, and 308 are configured to manage a life cycle of a flow. For example, a flow life cycle can have phases such as a temporary flow learn (TFL), a final flow learn (FFL), and a post final flow learn (PFFL). In some embodiments, the TFL can be used to ensure all initial packets of a flow are sent to the same WCPU 312. In some embodiments, the FFL can be used to apply WCPU specified policy to all the remaining packets of the flow. In some embodiments, the PFFL can be used to clean up the flow table 207 and for backup operation.

The TFL can involve the following exemplary operations:
1. Flow miss: A new flow has been received and the flow lookup missed.
2. TFL initiate: A TFL is initiated by the hardware (e.g., processor 206 (FIG. 2)) to register a new flow in the flow table 207.
3. Obtain WCPU_ID: The packet processor (e.g., processor 206 (FIG. 2)) performs load balancing to obtain a unique WCPU_ID, so that all packets of a given flow are sent to one WCPU 312.
4. Obtain LF_ID: The flow table 207 generates an LF_ID to store the flow policy/state/statistics in the later phase of the flow life cycle.
5. Obtain timestamp: The packet processor (e.g., processor 206 (FIG. 2)) provides a timestamp to identify the current time at which the flow is being learnt.
6. Update the flow entry: With {WCPU_ID, LF_ID, Timestamp}.

The FFL can involve the following exemplary operations:
1. WCPU 312 processes the first few packets of the flow and sets up Policy/State/Statistics for the subsequent packets of the flow.
2. The WCPU specified policy is applied in the flow table 207 to all subsequent packets of the flow.
3. State/Statistics are also updated in the flow table 207 on all subsequent packets of the flow.

The PFFL can involve the following exemplary operations:
1. Packetized interface: The flow table 207 provides a packet based interface to the WCPU 312 for supporting periodic backup.
2. Aging: Flows eventually end, with some flows taking milliseconds and others taking seconds or even longer. Once a flow ends, flow entries eventually are aged out to make space for new flow entries.

In some embodiments, switches 304, 314, and 308 are configured to provide a complex flow management which achieves high flow table scale, high flow learn/age rate, distributed system support, complex flow life cycle, and operation coherency. In some embodiments, system 300 using switches 304, 314, and 308 provides operations such as hardware reordering, learn cache, learn rate enhancements, age rate enhancements, and table indirection to achieve scale while performing complex flow management.

In some embodiments, the flow key lookup is implemented using a reordering algorithm (e.g., a cuckoo hashing algorithm, cuckoo filtering, or other algorithm). Switches 304, 314, and 308 are configured to reorder using hardware. If the flow table 207 (e.g., a hash table implemented using a cuckoo hashing algorithm) does not have space in any of the hash bank buckets, the table is reordered (e.g., entries need to be moved) to create space for a new learn entry. The hardware of switches 304, 314, and 308 is configured to support the high learn rate requirements by supporting multiple levels of reordering to support high flow scale. The hardware of switches 304, 314, and 308 includes a hardware-based reorder engine. The hardware reorder engine is configured to determine if buckets are full in the flow table 207 for the new entry and reorder entries in the flow table 207 according to a cuckoo algorithm in some embodiments. The hash table organization (number of parallel accesses and number of entries per access) can be designed to provide high memory utilization (e.g., 80%). In some embodiments, the reordering algorithm can be a depth first, a breadth first or other algorithm selected by a user. In some embodiments, a linear hashing algorithm is utilized. In some embodiments, the hardware supports a mix of full width and half width entries which can be used for various types of protocols (e.g., internet protocol (IP)v4 and IPv6).

A time window between the command issue and command completion exists because the external memory latency is large as well as variable. To ensure operation coherence during this time (e.g., appear as if this time gap does not exist), switches 304, 314, and 308 are configured to use a learn cache (e.g., cache 707 (FIG. 7)) to protect against duplicate learn operations and packets going to different PP identifiers (e.g., WCPU_ID) even if the packet processor 234 has not yet assigned the identifier. In some embodiments, the learn cache is on chip or integrated with switches 304, 314, and 308. To ensure the learn cache is used sparingly, a control from the flow group policy is provided to enable/disable caching. For example, the control for transmission control protocol (TCP) synchronization packets can be enabled or disabled by switches 304, 314, and 308. In some embodiments, the learn cache size is a few thousand entries, which is a compromise between chip cost and learn-burst absorption time (milliseconds). In some embodiments, switches 304, 314, and 308 are configured so that learn cache results have priority over the external memory results while entries are moved from the learn cache to the external memory in the background. In some embodiments, an increase in the size parameter increases the learn-burst absorption time of the device, and a decrease in the size parameter reduces the system cost. In some embodiments, the key update and WCPU_ID update operations are combined into one external memory access to reduce access bandwidth. In some embodiments, the key update and WCPU_ID update operations can be kept separate to minimize the learn cache size and increase learn-burst absorption time of the device.

In some embodiments, switches 304, 314, and 308 are configured to employ a learn scheme that does not serialize all of the learn operations. In some embodiments, switches 304, 314, and 308 are configured to pipeline the simple (e.g., no reorder) cases, while being configured to serialize the reorder cases (e.g., non-reorder learn operations are processed before processing a learn operation including a reorder operation). In some embodiments, switches 304, 314, and 308 are configured to support separate caches/queues for the simple and reorder cases, thereby ensuring the simple cases are not unacceptably stalled by the reorder cases. In some embodiments, the flow table 207 (FIG. 2) is partitioned into groups or chunks, and hardware reordering controllers are duplicated.

In some embodiments, switches 304, 314, and 308 are configured to not update the hit/timestamp table on every packet. In some embodiments, switches 304, 314, and 308 are configured to update on a first packet of the flow (i.e. when the flow is being learned). In some embodiments, the current timestamp is stored as part of the short policy (e.g., 128*b* associated data with the 384*b* key data forms the flow table entry).

In some embodiments, switches 304, 314, and 308 are configured to provide age instructions which can be performed inline. In some embodiments, the inline age operation piggy-backs on the packet lookup and ages the stale entries in the buckets that were read for packet management operations. This technique preferentially ages out entries in buckets that already have entries and helps proactively free up space in those relatively filled buckets. A queue of age events is maintained and pushed one per clock in some embodiments. In some embodiments, switches 304, 314, and 308 are configured to support timer based aging where a background timer sequentially iterates through all the entries of the flow table 207, checks whether the flow duration exceeds the configured threshold and if so, ages out (i.e. deletes) the entry. Timer based aging can be slower than inline aging. In some embodiments, the timestamp can be the full 64 byte (b)/48b timestamp, a quantized approximately 8b timestamp or a 1b hit bit.

In some embodiments, switches 304, 314, and 308 are configured to decouple the policy/state/stats DB s from the key table DB to support multiple use cases. In some embodiments, the key table entry moves to improve hash table utilization so that the ingress policy/state/stats entries do not need to be moved when the hash table entries are ordered. In some embodiments, for bi-directional flows, two key entries point to one policy/state/stats entry. In some embodiments, LF_ID (Logical Flow ID) is a redirection pointer that enables this decoupling. The packet processor 234 implements a free address pool scheme to support the Ingress LFID generation. This free address pool can be queried by the WCPU 312 and the resultant LFID can be passed to the flow table manager as part of the FFL. In some embodiments, switches 304, 314, and 308 are configured to support separate LF IDs for ingress and egress switches 304 and 314. Instead of a free address pool scheme, a compression FIFO (e.g., memory 908 (FIG. 9)) with background scan is utilized in some embodiments.

An exemplary flow learn operation is described below. A new flow is received at switch 304. During the TFL, switch 308 accesses the flow table 207 (external memories 212 and 214 in FIG. 2) and assigns the I-LFID and sends packets to the WCPU 312 through the fabric 310. The WCPU processes the first few packets of the flow and determines the egress switch 314 for the flow by performing an E-LFID query.

After or at the end of TFL (e.g., during or just before FFL), the WCPU 312 provides LFID linkage and provides the E-LFID and updated policy for the flow to switch 304 for storage in the flow table 207. After FFL, the packets of the flow are forwarded to the egress security switch 314 through fabric 310. The egress security switch 314 receives the packets and updates statistical information using the E-LFID. The egress security switch 314 provides the packets to the destination port.

Figure 4:
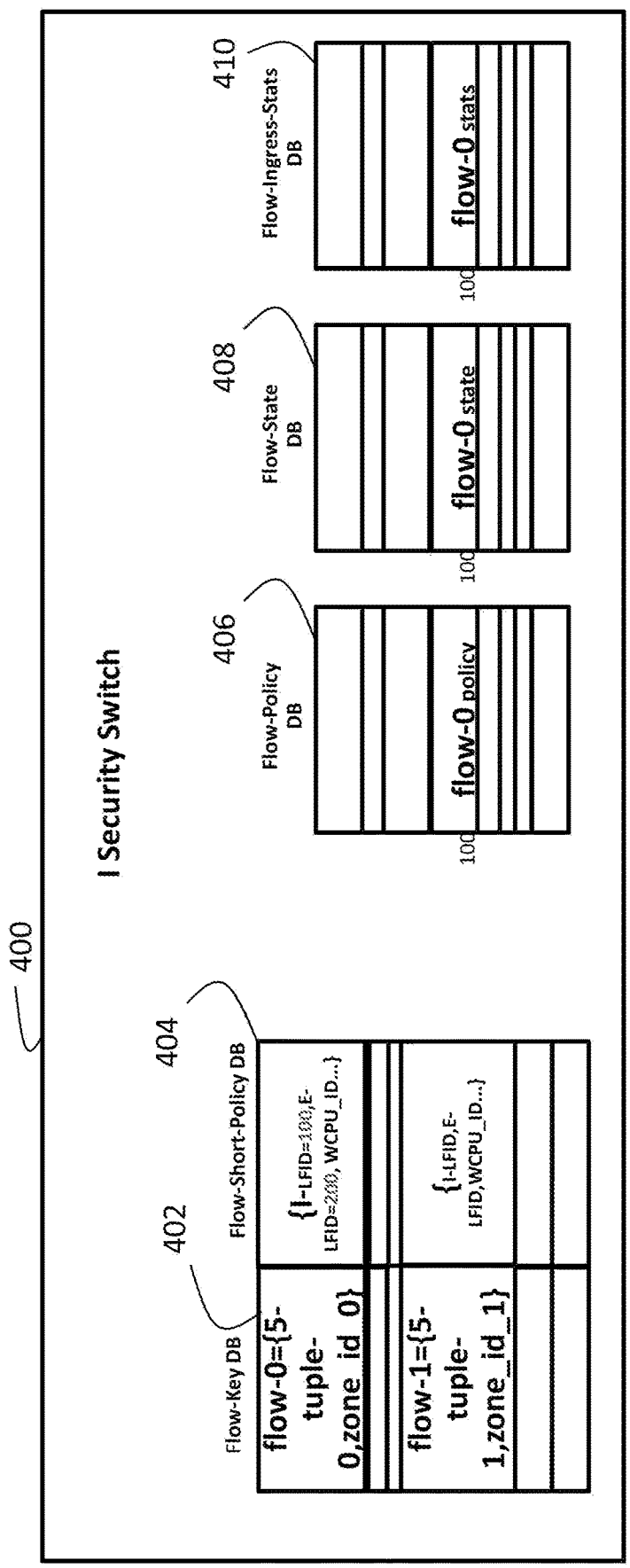
FIG. 4 is a block diagram of a flow table for an ingress security switch in the system illustrated FIG. 3 according to some embodiments.
Figure 5:
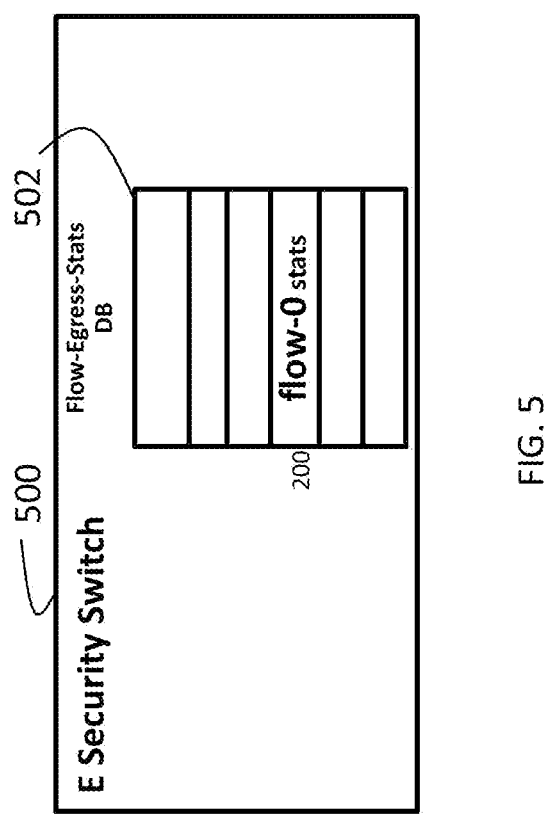
FIG. 5 is a block diagram of a flow table for an egress security switch in the system illustrated in FIG. 3 according to some embodiments.

With reference to FIG. 4, a flow table 400, similar to flow table 207 (FIG. 2), for the ingress security switch 304 includes a flow key database 402, a flow-short-policy database 404, a flow-policy database 406, a flow-state database 408, and a flow-ingress-stats database 410. Exemplary contents of flow table 400 are shown after FFL. With reference to FIG. 5, a flow table 500, similar to flow table 207 (FIG. 2), for the egress security switch 314 includes a flow-egress-stats database 502. Exemplary contents of flow table 500 are shown after FFL. Flow-table constituents are linked by I-LFID in the ingress security switch 304 and by E-LFID in the egress security switch 314 in some embodiments.

Figure 6:
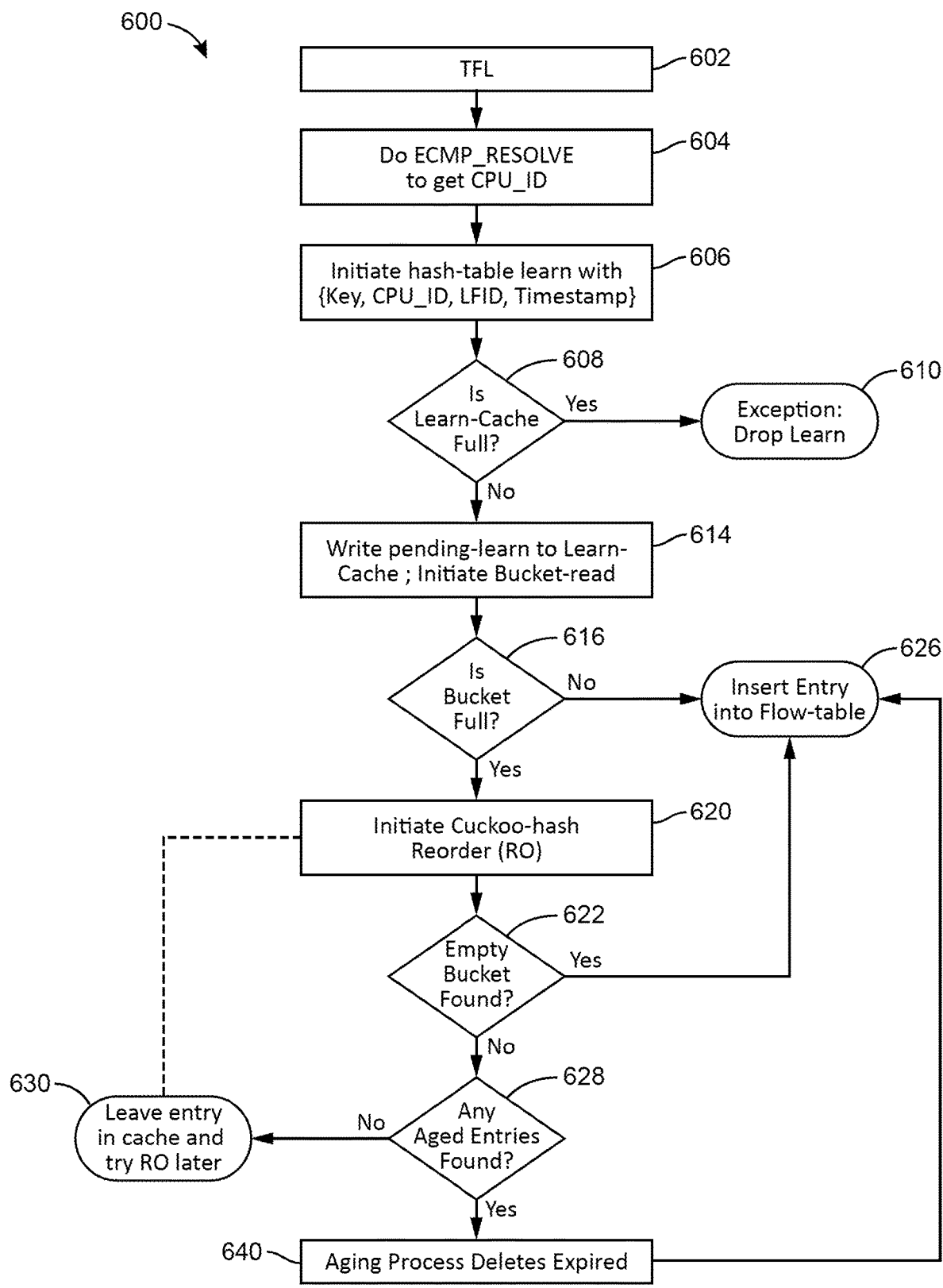
FIG. 6 is a flow diagram showing temporary learn operations for the security switch illustrated in FIG. 2 according to some embodiments.

With reference to FIG. 6, system 300 can perform a TFL in accordance with an operational flow 600 in some embodiments. TFL begins at an operation 602. At an operation 604, an equal cost multi-path resolve operation is performed by ingress security switch 304 to obtain an identification of WCPU 312. At an operation 606, a hash table entry learn or flow table entry learn operation is performed to obtain flow table data (e.g., the LFID, key, the identification of WCPU 312, and the timestamp) for an entry for the flow. At an operation 608, the learn cache is checked to determine if the learn cache is full. If so, an exception is performed at an operation 610 and the flow 600 is dropped. If not, an operation 614 is performed. In operation 614, a pending learn is written to the learn cache and a bucket read is initiated.

At an operation 616, the flow table 207 is checked to determine if the buckets are filled. If so, a reorder (e.g., cuckoo hash reorder) operation is performed at an operation 620 and the flow 600 advances to an operation 622. If not, an operation 626 is performed. In operation 626, the entry is written into the flow table 207.

At an operation 622, the buckets are checked to determine if a bucket is empty. If so, the flow 600 advances to the operation 620. If not, an operation 628 is performed. In operation 628, the flow table 207 is searched for an aged entry. If an aged entry is found, an aging operation 640 is performed to delete or remove an expired entry and flow 600 advances to operation 626. If an aged entry is not found, an operation 630 is performed. In operation 630, the entry is left in the learn cache and operation 620 is performed at later time.

Figure 7:
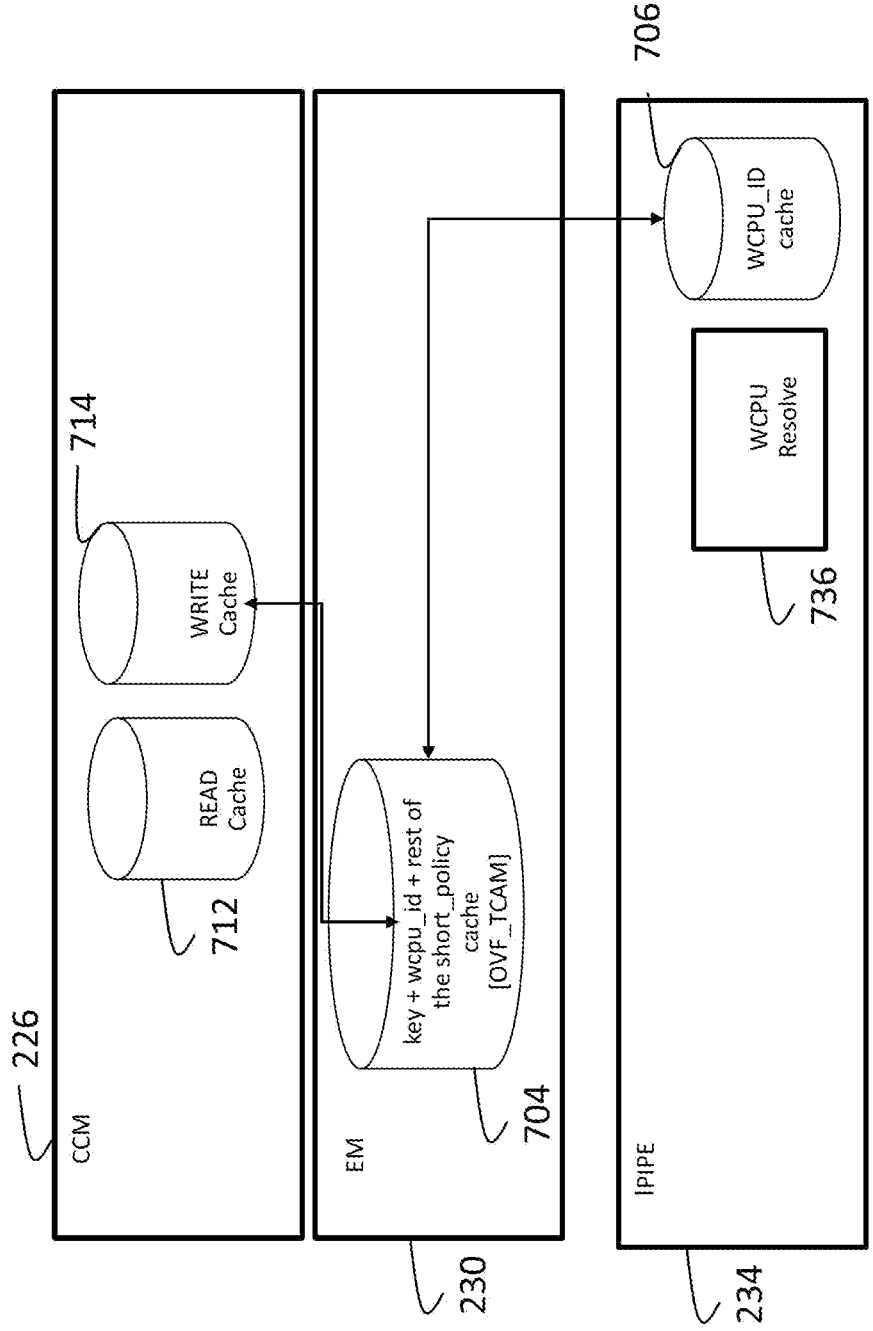
FIG. 7 is a block diagram of caches for the security switch illustrated in FIG. 2 according to some embodiments.

With reference to FIG. 7, processor 206 (FIG. 2) includes cache and coherency management controller 226 including a read cache 712 and write cache 714, exact match engine 230 including a cache 704, and packet processor 234 including a cache 706 in some embodiments. Caches 712, 714, 704, and 706 are used as caching points for the flow learn operations. The size of caches depends on desired or acceptable external-memory latencies in some embodiments.

Read cache 712 and write cache 714 are configured to hold data before the data is sent to external memory (e.g. external memories 212 and 214). Multiple accesses to a same entry can be handled by caches 712 and 714. Depth for caches 712 and 714 can be selected in accordance with system parameters and design considerations as discussed above.

Cache 704 is a multi-purpose structure in the exact match engine 230 in some embodiments. Cache 704 is used as an overflow ternary content addressable memory and provides key and short policy storage until the learn operation is launched. Cache 704 stores the key, short policy, and WCPU identification (e.g., {Key+Short-policy including WCPU_ID}). A partial write is done, once a cache miss is detected (only the key is known at this point) in some embodiments. A complete write (for short-policy data) is available after WCPU resolution in some embodiments. Cache 704 has a depth of 16 in some embodiments. At a rate of 16M learn/sec, a time of 62.5 ns per learn is achieved. If external memory access-time=4 us, the depth of cache 704 is 64 (4 us/62.5 ns equals 64) in some embodiments.

Cache 706 is an ingress pipeline cache and is part of packet processor 234 in some embodiments. Cache 706 is configured to handle consistent WCPU assignment for packets of the same flows. WCPU resolve hardware 736 is configured for resolve operations used in the flow learn operations such as flow 600 (FIG. 6). Cache 706 stores the exact match cache index and the WCPU identification (e.g., {EM-cache-Index, WCPU_ID}) which is written post WCPU-resolution and released once cache 704 has been updated for the flow. Cache 706 is N-deep to cover the latency from a cache miss (e.g., MISS→WCPU_ID determination) (e.g., N=50).

Figure 8:
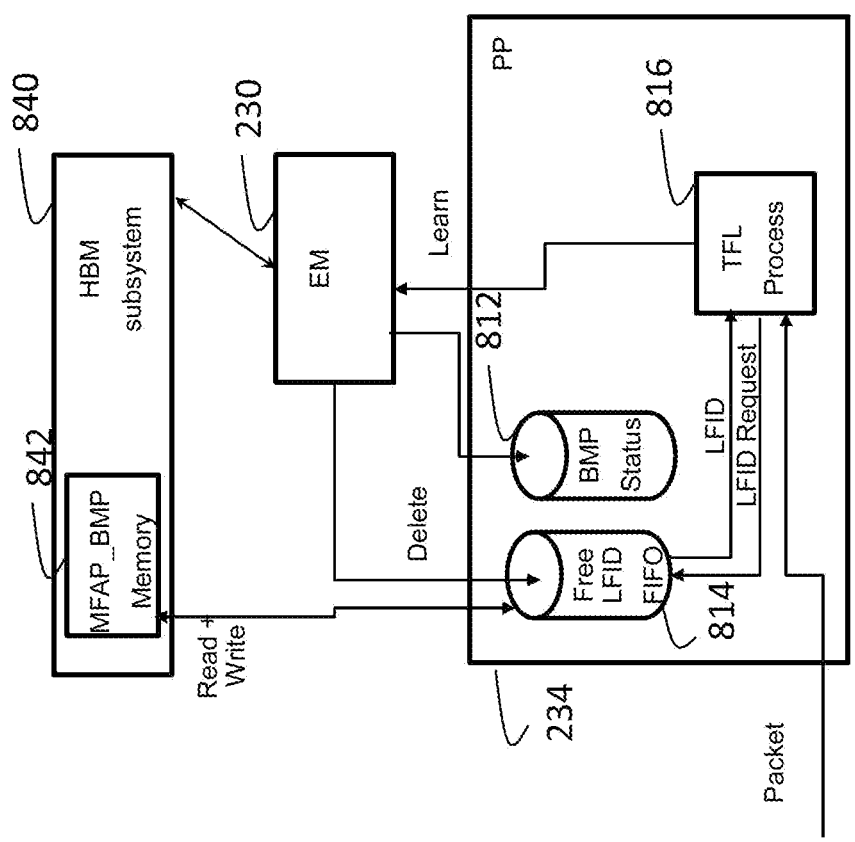
FIG. 8 is a block diagram of a packet processor including a bit map memory for the security switch illustrated in FIG. 2 according to some embodiments.

With reference to FIG. 8, a unique LFID (free pointer) is generated every cycle for use in the learning process. In some embodiments, a Memory Free Address Pool M-FAP style approach (which maintains a set of free addresses that can be used) is used to build a free-LFID list for use in background processes that scan the flow table 207 to populate a free-LFID list. In some embodiments, packet processor 234 includes a TFL process engine 816, a bit map status memory 812, and a free LFID first-in first out (FIFO) memory 814. Engine 816 manages TFL operations such as in flow 600 (FIG. 6). Bit status memory 812 is used to track non-zero rows of memory 842.

Packet processor 234 is coupled with HBM subsystem 840 (e.g., controller 220, cache and coherency management controller 226 and external memories 212 and 214 in FIG. 2) which includes a memory 842. Memory 842 stores the free-LFID list as a bit map (e.g., a 25600×8192b bit map memory) for 200M flows. Memory 842 is part of external memory 214 or 216 in some embodiments.

HBM subsystem 840 maintains an on-chip state to read the memory 242 and populates the free LFID FIFO memory 814 in packet processor 234. In some embodiments, a 16K×32b LFID-FIFO memory stores the LFID list. The data read from memory 842 is fed into the FIFO memory (e.g., memory 814). In some embodiments, a 1b per row indication is stored if a row has free-LFIDs=25600×1b. The indication is updated when a particular row of memory 842 for a recycled LFID is updated. Assuming a TFL rate of approximately 5M/second (s), 16K indices are processed every approximately 3.2 ms in some embodiments. Launching one read every 1-2 ms to memory 842 allows the learn rate to be achieved with low bandwidth on the interface for external memories 212 and 214 (approximately 1 Kilobyte/s) according to some embodiments.

Figure 9:
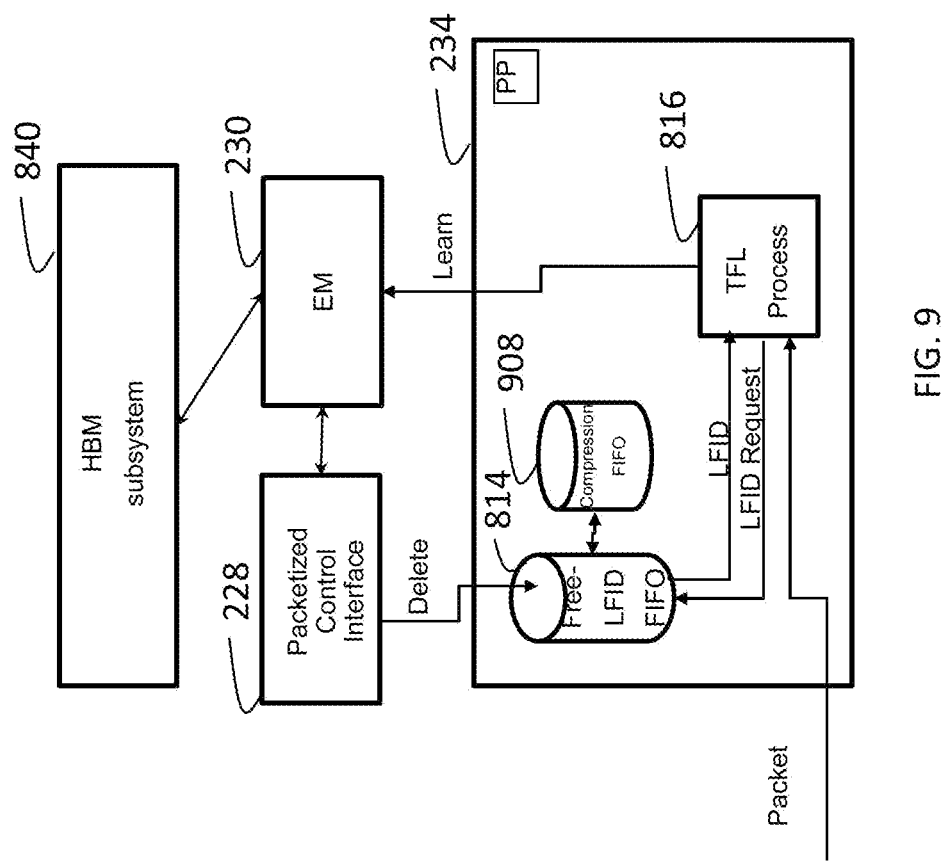
FIG. 9 is a block diagram of a packet processor including a compression FIFO for the security switch illustrated in FIG. 2 according to some embodiments.

With reference to FIG. 9, a background approach is used to build a free-LFID list for use by background processes that scan the flow table 207 to populate the free LFID list. In some embodiments, packet processor 234 includes TFL process engine 816, a first in first out (FIFO) memory 902, and a free LFID FIFO memory 814. Memory 902 is a compression FIFO configured to pick a continuous range of indices from free LFID FIFO memory 814 and store them as a range, thereby increasing index storage efficiency (e.g., probabilistic storage expansion).

In some embodiments, exact match engine 230 is configured to read multiple buckets for reordering. During this operation, exact match engine 230 is configured to find temporary-flow-entries that have expired and deletes the temporary-flow-entries that have expired and recycles the LFIDs. In some embodiments, packetized control interface 228 is configured to perform a continuous background scan of the flow table 207 (taking several seconds or minutes) to export statistics in some embodiments. Packetized control interface 228 also finds expired entries and recycles the expired LFIDs. Packetized control interface 228 is aware of WCPU-based deletes.

FIFO memory 814 is optimized in the pipeline to store the indices provided by the above operations. If the memory 814 is full, the last read address in flow table 207 is stored and adding indices to memory 814 is stopped. In the next scan-cycle, recycled indices are only from last-read-address. Advantageously, this technique does not require additional memory/access to external memories 212 and 214.

Switch 204 can perform aging processes (e.g. operation 640 in FIG. 6) to remove entries from flow table 207. According to a LCPU based aging technique, LCPU or internal processor 222 responds to a temporary learn notification and does a periodic read (via exact match engine 230) of flow table 207. If the current time recorded is greater than a recorded period, the entry is aged. In some embodiments, to prevent an error when LCPU decides to age an entry while WCPU updates an entry, a long period (e.g., 500 round trip times) and 64 b time stamps can be used to reduce the chance of such an error. According to an exact match engine based aging technique, exact match engine 230 searches the hash table, retrieves the bucket and checks for vacancy. If no vacancy is found, reordering is initiated. Exact match engine 230 can check if a bucket has a temporary entry, and if the current time recorded is greater than a recorded period, the entry is used as a vacant spot.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in port or destination quantity, data types, methods of reinsertion, reintroduction, etc., values of parameters, arrangements, etc.). For example, the position of elements may be reversed or otherwise varied, the connections between elements may be direct or indirect, such that there may be one or more intermediate elements connected in between, and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions, and arrangement of the exemplary embodiments without departing from the scope of the present disclosure. For example, the embodiments of the present disclosure may be implemented by a single device and/or system or implemented by a combination of separate devices and/or systems.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, NAND, NOR, CD-ROM or other optical disk storage, magnetic disk storage or other magnetic storage devices, or any other medium which can be used to carry or store desired program code in the form of machine-executable instructions or data structures and which can be accessed by a general purpose or special purpose computer (i.e., ASICs or FPGAs) or any other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

What is claimed is:

1. A switch, comprising:
memory comprising a flow table comprising a flow key database and a flow policy database for flows in a network associated with the switch; and
a processor comprising an exact match engine and a packet processor engine, wherein the exact match engine is a hardware component configured to manage the flow table in the memory, wherein the exact match engine comprises a learn cache configured to store key entries, wherein the exact match engine is configured to write an entry associated with a flow miss into the learn cache, wherein the packet processor engine is configured to determine an existence of an empty bucket of the flow key database, wherein the entry associated with the flow miss is stored in the empty bucket of the flow key database, wherein the packet processor engine is configured to perform a reorder operation if the empty bucket does not exist for the entry associated with the flow miss, wherein entry associated with the flow miss is stored in an uncovered bucket of the flow key database if the reorder operation uncovers the uncovered bucket, wherein the packet processor engine is configured to perform an aging operation if the uncovered bucket does not exist after the reorder operation, wherein the entry associated with the flow miss is stored in an aged bucket of the flow key database if the aging operation discovers the aged bucket, wherein the entry remains stored in the learn cache if the aging operation does not uncover an aged entry.

2. The switch of claim 1, wherein the flow table is configured to have the flow key database separate from the flow policy database, and wherein the processor is a security processor and the switch is a security switch.

3. The switch of claim 2, wherein the security processor is configured to provide learn rate enhancements, age rate enhancements, and table indirection to achieve scale while performing complex flow management.

4. The switch of claim 2, wherein the security processor is disposed on a single integrated circuit substrate.

5. The switch of claim 4, wherein the memory is disposed on a separate integrated circuit device and the security processor is configured to perform hardware based reordering, wherein entries for the flow policy database do not need to be moved when the entries for the flow key database are reordered.

6. The switch of claim 5, wherein the security processor and the memory are in a single package.

7. The switch of claim 5, wherein the security processor and the memory disposed on an interposer board.

8. The switch of claim 5, wherein the learn cache is configured to store a short policy database linked with the flow key database.

9. The switch of claim 2, wherein the security processor is configured to process non-reorder learn operations before processing a learn operation including the reorder operation.

10. The switch of claim 2, wherein the security processor comprises a hardware-based reorder engine configured to reorder the flow table when buckets in the flow table are filled for a key entry of the key entries in the cache.

11. A method of flow management, the method comprising:
receiving a packet at a switch;
determining a working processor identification for the packet;
performing a flow table entry learn using the working processor identification for a flow associated with the packet to obtain data for an entry for the flow;
writing the entry for the flow to a learn cache integrated with the switch using an exact match engine configured to write the entry into the learn cache;
determining an existence of an empty bucket in a flow key database of a flow table using a packet processor engine, wherein the entry is stored in the empty bucket of the flow key database;
performing a reorder operation if the empty bucket does not exist for the entry, wherein the entry is stored in an uncovered bucket of the flow key database if the reorder operation uncovers the uncovered bucket;
performing an aging operation if the uncovered bucket does not exist after the reorder operation, wherein the entry is stored in an aged bucket of the flow key database if the aging operation discovers the aged bucket, wherein the entry remains stored in the learn cache if the aging operation does not uncover the aged bucket.

12. The method of claim 11, further comprising:
performing a bucket read after writing the entry.

13. The method of claim 12, further comprising:
initiating the reorder operation if buckets are full.

14. The method of claim 13, further comprising:
determining if a bucket is empty; and
inserting the entry into the flow table if the bucket is empty.

15. The method of claim 11, further comprising:
inserting the entry into the flow table.

16. An apparatus, comprising:
a memory configured to store a flow table comprising a flow key database; and
a processor configured for packet processing and separate from the memory, the processor comprising a learn cache, a packet processor engine and an exact match engine, the exact match engine being configured to manage the flow table, the learn cache being used to place an entry for a new flow into the flow table, the exact match engine being a hardware unit, wherein the exact match engine is configured to write an entry associated with a flow miss into the learn cache, wherein the packet processor engine is configured to determine an existence of an empty bucket of the flow key database, wherein the entry associated with the flow miss is stored in the empty bucket of the flow key database, wherein the packet processor engine is configured to perform a reorder operation if the empty bucket does not exist for the entry associated with the flow miss is, wherein the entry associated with the flow miss is stored in an uncovered bucket of the flow key database if the reorder operation uncovers the uncovered bucket, wherein the packet processor engine is configured to perform an aging operation if the uncovered bucket does not exist after the reorder operation, wherein the entry associated with the flow miss is stored in an aged bucket of the flow key database if the aging operation discovers the aged bucket, wherein the entry remains stored in the learn cache if the aging operation does not uncover the aged bucket, wherein the packet processor engine is configured to perform the reorder operation at a later time if the aged bucket is not uncovered.

17. The apparatus of claim 16, wherein the processor is configured for hardware reordering, learn rate enhancements, age rate enhancements, and table indirection to achieve scale while performing complex flow management.

18. The apparatus of claim 16, wherein the flow table comprises key entries and policy index entries.

19. The apparatus of claim 18, wherein the key entries and policy index entries are decoupled from each other and wherein two key entries point to one policy entry for bidirectional flows.

20. The apparatus of claim 16, wherein the processor and the memory are disposed on an interposer board in an integrated circuit package.

* * * * *